Figure 1:
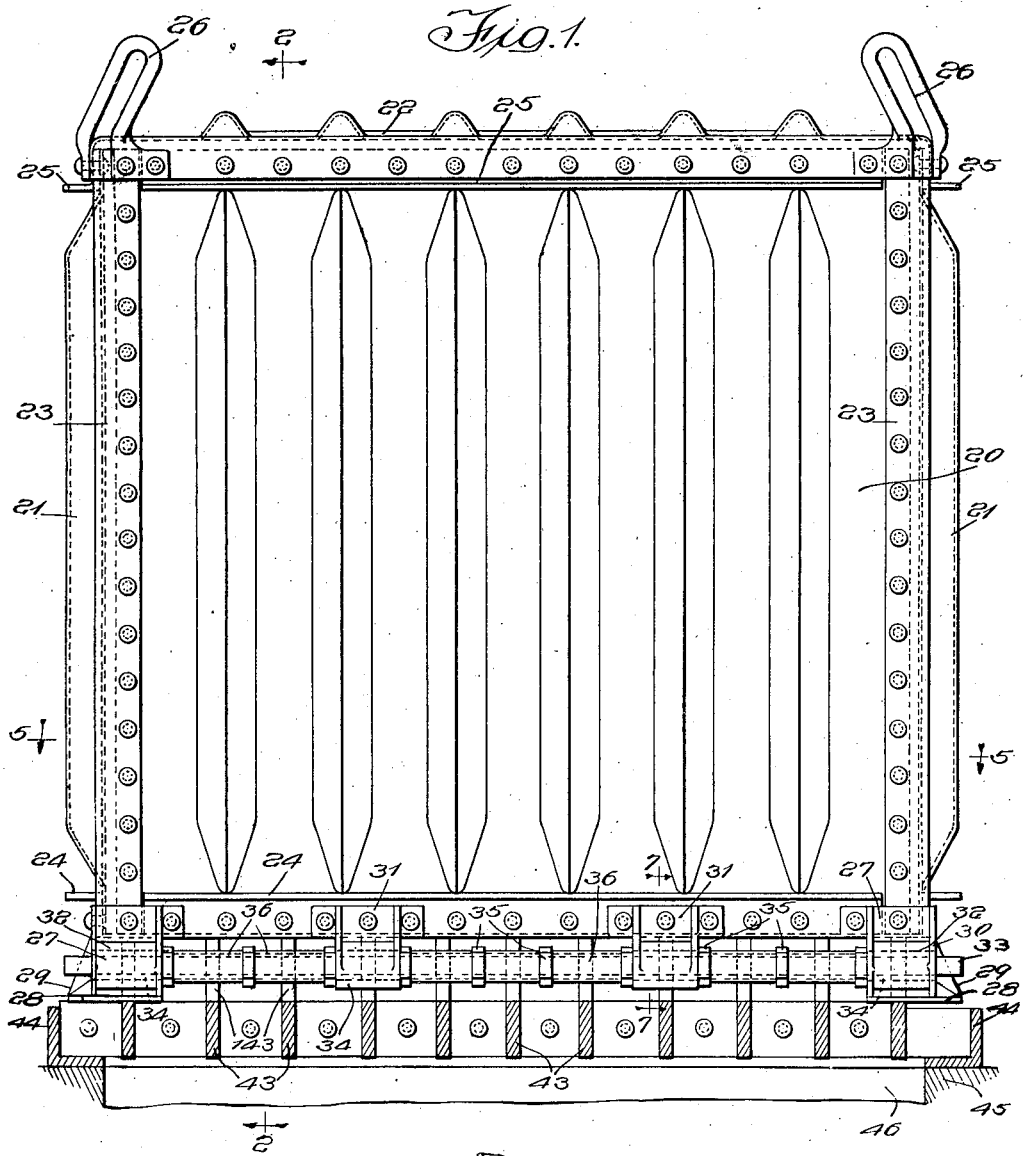

June 25, 1935.   F. DITCHFIELD   2,005,823
MEANS FOR TRANSPORTING ARTICLES
Filed May 14, 1931   5 Sheets-Sheet 1

Witness:
William P. Kilroy

Inventor:
Frank Ditchfield
By Joseph Harris
His Atty.

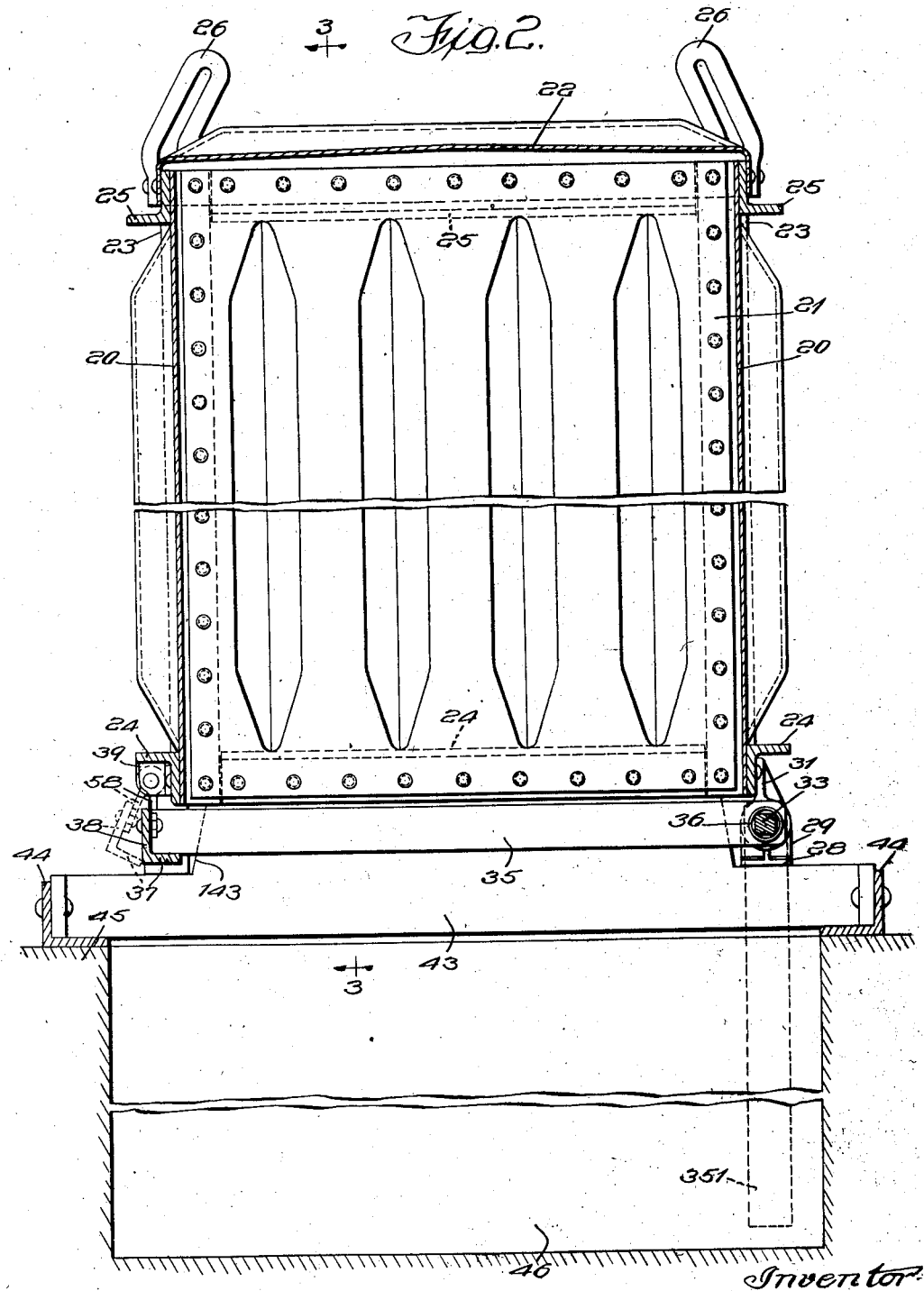

Inventor:
Frank Ditchfield

June 25, 1935.  F. DITCHFIELD  2,005,823
MEANS FOR TRANSPORTING ARTICLES
Filed May 14, 1931  5 Sheets-Sheet 4

Witness:
William P. Kilroy

Inventor:
Frank Ditchfield
Joseph Harris
By his Atty.

June 25, 1935.  F. DITCHFIELD  2,005,823
MEANS FOR TRANSPORTING ARTICLES
Filed May 14, 1931  5 Sheets-Sheet 5

Witness:
William P. Kilroy

Inventor:
Frank Ditchfield
By Joseph Harris
his Atty.

Patented June 25, 1935

2,005,823

UNITED STATES PATENT OFFICE 2,005,823

MEANS FOR TRANSPORTING ARTICLES

Frank Ditchfield, Cleveland, Ohio, assignor to The Youngstown Steel Door Company, Cleveland, Ohio, a corporation of Ohio Application May 14, 1931, Serial No. 537,343

12 Claims. (Cl. 294—69)

This invention relates to improvements in means for transporting articles, and more particularly with reference to the transportation of merchandise in heavy metallic containers adapted to be loaded and transported on open top railway cars, trucks, boats and the like.

Heretofore, in the transportation of packaged merchandise and other goods and materials, it has been a common practice to employ what are known as containers, each consisting of a box-like unit provided with doors on one or more ends or sides thereof, which doors are held closed by any suitable form of door operators and the handles then sealed with the usual railroad car seals. In using containers of said type, the same are loaded through the door openings of the containers at the place of business of the consignor, the containers then being closed and sealed and transported, usually by truck, to the forwarding railroad station or vessel and, after delivery to the consignee, the doors opened and the goods, merchandise or articles removed.

In using containers of the type referred to, it is evident that the same will often remain at the place of business of the consignee and/or consignor for considerable length of time, awaiting loading or unloading, it being generally impracticable for the trucks which usually transfer the containers to and from the railroads to wait or stand idle while the containers are being loaded or unloaded. The result is that an excessive number of containers with corresponding excessive investment therein is required to efficiently handle a given volume of business.

To some extent, it has also been heretofore the practice to employ containers having either a false or detachable bottom or inner telescoped cage, the false bottoms or cages being loaded at the place of origin and, after loading, the outer shells or containers proper being then brought to the point of loading and assembled with the loaded bottoms or inner cages and the locked assemblies then transported to destination, where the outer shells or containers proper are removed for further service, leaving the false bottoms or cages to be later unloaded. With such type of containers having false bottoms or separable inner cages, an obviously greater number thereof are required than the number of shells or containers proper with corresponding increased investment in equipment. Also, there are the obvious disadvantages of having to stack or pile the false bottoms or removable cages until such time as they are again required for use and danger of being damaged or mislaid.

One object of my invention is to provide an improved container for transporting articles such as packaged merchandise, wherein the containers may be kept in active service or use the maximum amount of time to the end that for handling a given volume of business, the minimum investment for equipment is required and possibility of losing or damaging any separable or detachable parts, is eliminated.

Another object of my invention is to provide an improved transportation container for articles such that the articles may be stacked, piled or assembled on a temporary platform or base, the container then dropped or telescoped over the pile, stack or assembly, and the bottom of the container closed beneath the stacked articles while resting upon the temporary platform, the container and contents then removed from the temporary platform and transported to place of destination where the contents are dischargeable from the container by depositing the same in a stack or pile on a similar platform, thus permitting the container to be taken away and immediately used in service.

Another object of my invention is to provide an improved transportation container for articles, such as packaged merchandise wherein the loading of the container is effected through the bottom thereof and the bottom closure means for the container placed in operative closed condition without disturbing the lading and, conversely, the container unloaded by first opening the bottom of the container and withdrawing the container, leaving the contents deposited on a suitable platform or other arrangement.

Further objects of my invention will more clearly appear from the description and claims hereinafter following.

Figure 8:
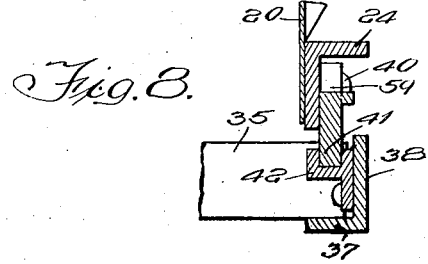
Figure 3:
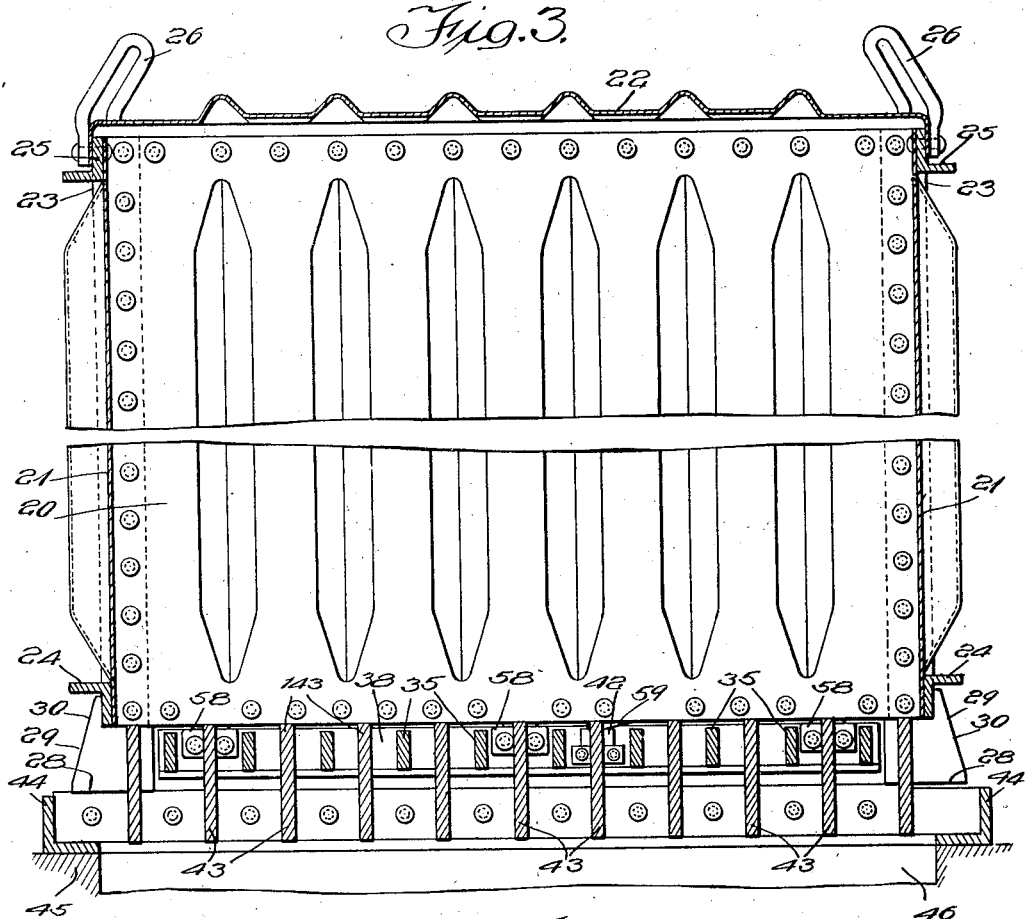
Figure 4:
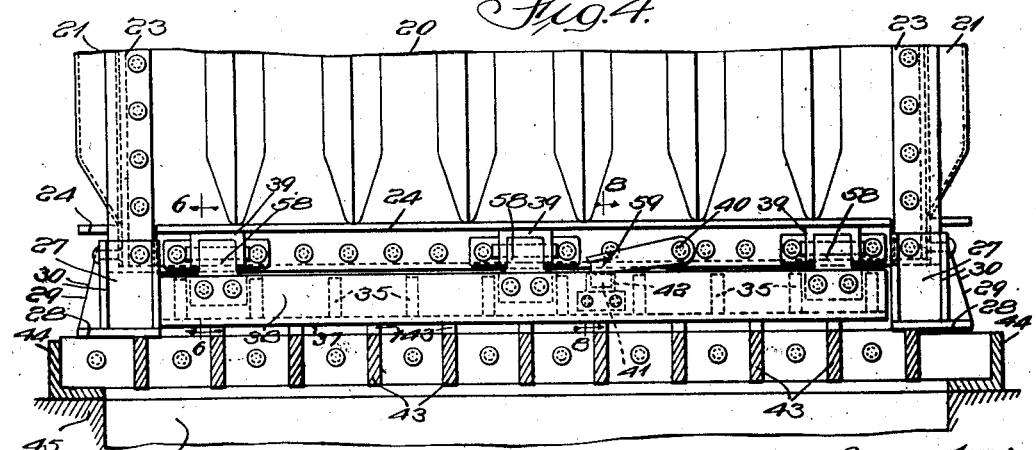
Figure 5:
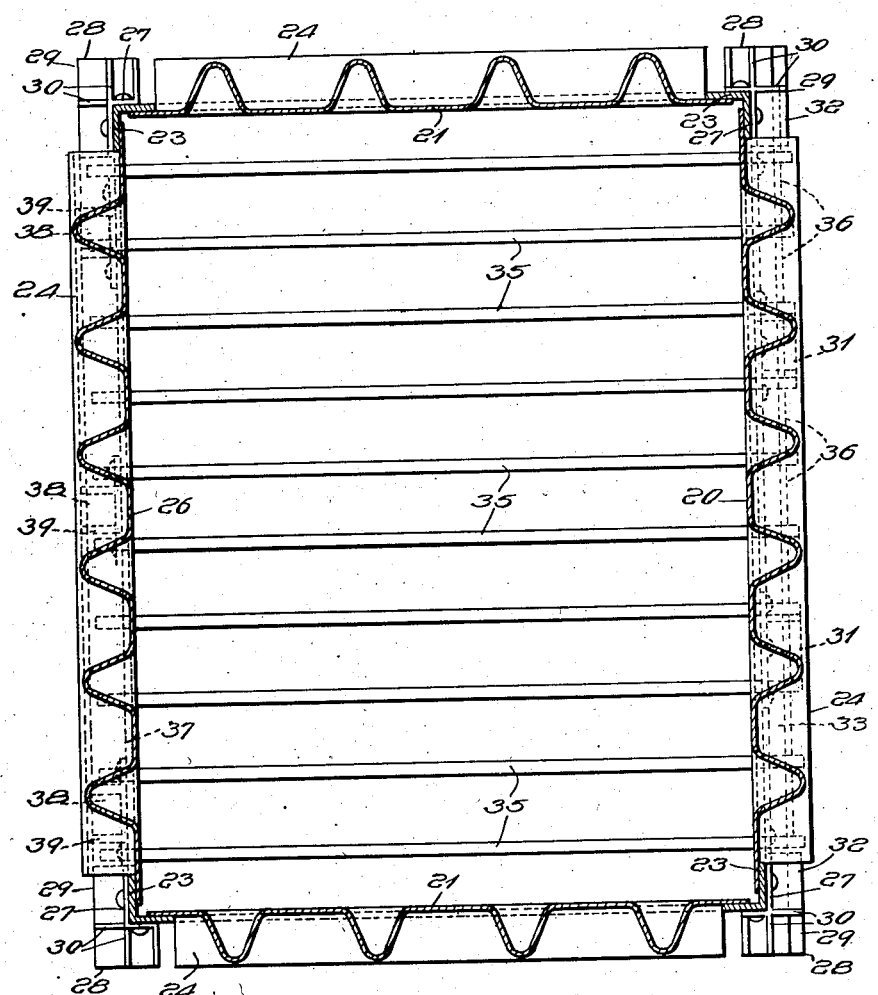
Figure 6:
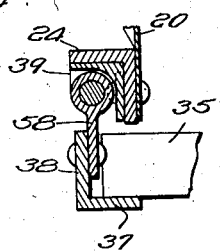
Figure 7:
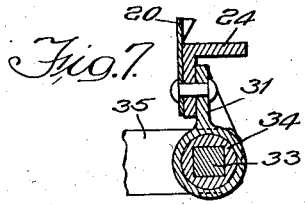
Figure 9:
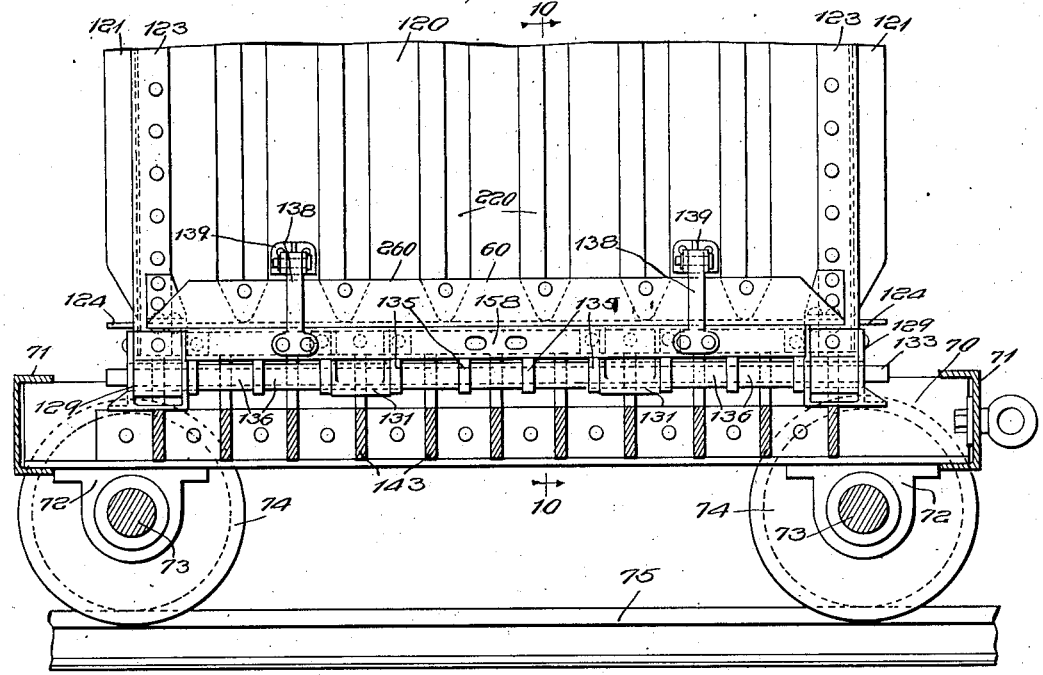
Figure 10:
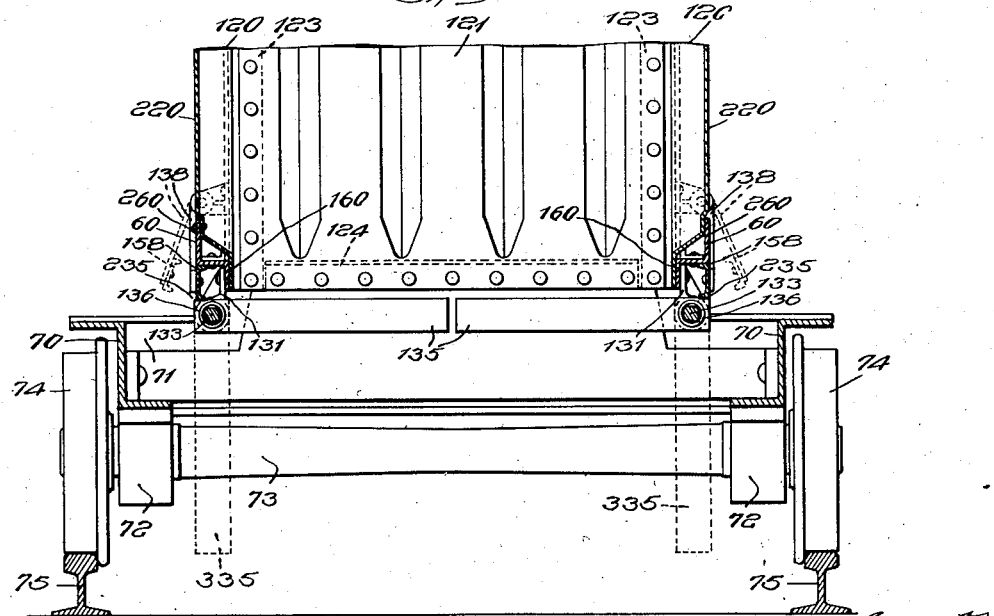

In the drawings forming a part of this specification, Figure 1 is a side elevational view of my improved container and a vertical, sectional view of a platform employed in connection therewith. Figure 2 is a vertical, sectional view, corresponding to the line 2—2 of Figure 1. Figure 3 is a vertical, sectional view, corresponding to the line 3—3 of Figure 2. Figure 4 is a view similar to Figure 1 but illustrating the opposite side of the container, the upper portion of the container being broken away to accommodate the figure on the sheet. Figure 5 is a horizontal, sectional view, corresponding to the line 5—5 of Figure 1. Figure 6 is a detailed, vertical, sectional view, corresponding to the line 6—6 of Figure 4. Figure 7 is a view similar to Figure 6, corresponding to the line 7—7 of Figure 1. Figure 8 is a detailed, sectional view illustrating a latch employed on the container and corresponding to the line 8—8 of Figure 4. Figure 9 is a view similar to Figure 1, illustrating another embodiment of my improved means of transportation. And Figure 10 is a vertical, sectional view, corresponding to the line 10—10 of Figure 9.

In said drawings and referring first to the arrangements shown in Figures 1 to 8 inclusive, the improved container is shown as comprising vertically corrugated sheet metal side walls 20—20; similarly corrugated sheet metal end walls 21—21; corrugated sheet metal roof 22; corner angle posts 23—23 to which the vertical edges of the side and end wall sheets are riveted; bottom edge frame angles 24—24 around all sides; and top side and end angle plates 25—25. As customary in the type of container illustrated, suitable means for handling the same by cranes are provided at the upper corners thereof which, in the form illustrated, comprise loops 26—26 riveted to the side and end plates 25 at the corners, as shown.

As clearly shown in the drawings, the container is open at the bottom and is adapted to be supported with the bottom edges of the side and end walls (and the grid bottom closure or door hereinafter described) in an elevated position, when the container is resting on a car floor or other support, by four corner supporting or pedestal castings 29—29, each having a flat base 28, vertical webs 27—27 and strengthening ribs 30—30. Said pedestal castings are suitably riveted to the lower frame angles 24 and corner posts 23, as clear from the drawings.

To provide suitable closure means for the open bottom of the container and to support and retain the lading therewithin, the following means are employed. Secured to the bottom angle along one side of the container, as shown in Figure 1, are a plurality of bearing brackets 31—31 having bearings therein alined with corresponding bearings 32—32 in the adjacent corner castings or pedestals 29. Rotatably mounted in said pedestal castings 29 and brackets 31 is a preferably square shaft 33, having suitable bushings 34 thereon disposed within the respective pedestals and brackets, as best illustrated in detail in Figure 7. Non-rotatably mounted on the shaft 33 is a plurality of rigid bars 35—35, maintained in uniformly spaced relation by suitable spacers 36—36 also mounted on the shaft 33. Each of the bars 35 is preferably of elongated, rectangular cross section with the major dimension extending vertically so as to afford the greatest strength against bending when the load of the contents of the container is placed thereon. As will be evident, all of the bars 35 are adapted to move in unison whenever the shaft 33 is rotated, and manifestly the shaft may be rotated by any suitable wrench or corresponding tool applied to an extended end thereof.

Referring to Figure 2, it will be noted that the bars 35 are of such length as to extend completely across the bottom opening of the container and beyond the opposite side wall where the free ends of said bars are all adapted to be supported and retained by the lower inturned flange 37 of an angle 38, which extends the full length of the side of the container and is supported at suitable intervals throughout its length by hinge butts 58 pivoted to hinge brackets 39 in turn secured to the corresponding base angle 24, as shown best in detail in Figure 6. As clear from Figure 2, the pivotal axis of support of the angle 38 is above and substantially in line with the ends of the bars 35 so that there is a normal tendency for the angle 38 to move, under the influence of gravity, to its operative supporting position and so remain. When the angle 38 is in the position shown by full lines in Figure 2, it is evident that the closure means for the bottom of the container will be held in operative position and, upon swinging the latching angle 38 outwardly to the dotted line position shown in Figure 2, all of the bottom bars 35 will be released and the same permitted to fall down to the dotted line position shown at 351 in the same figure. To maintain the latching angle 38 in its operative position, any suitable means may be employed, as for instance a dog 59 pivoted to the adjacent base angle as indicated at 40, said dog 59 having a depending lug 41 arranged to engage in a socketed casting 42 secured to the inner face of the angle 38, as shown best in Figures 4 and 8.

Cooperable with the improved container, is a support or platform which, as shown, comprises a plurality of bars 43—43, rigidly secured to and supported by angles 44—44 at their opposite ends, said angles 44 in turn being secured to or supported on any suitable foundation, such as indicated conventionally at 45. Said bars 43 are extended over a pit 46, as shown in Figure 2, for the purpose hereinafter described. Each of said bars 43 is of greater extent than the width of the container, as shown in the same figure, and each bar has an upward extension 143 with preferably beveled ends, the length of each upward extension 143 being such that it will be easily accommodated between the latching angle 38 and the shaft carried by the container, as shown in Figure 2. Referring to Figure 3, it will further be observed that the central or upwardly projector portions of the bars 43 are of such height that, when the container is supported by its corner pedestal castings 29 on the grid platform, the upper edges of said bars 43 will be slightly above the upper edges of the container bars 35 for the purpose about to be described.

In carrying out my invention, the articles to be transported, as for instance packaged merchandise, are stacked or piled upon the grid temporary platform and confined within the plan area defined by the upwardly extended portions 143 of the stationary or fixed grid bars. After the articles have been stacked, piled or assembled on the grid platform, the container is then brought to a position over the stack or pile by a crane and, with the bottom closure bars of the container hanging down in a depending position, the container is then lowered over the stack or pile until it comes to rest on the platform, thus placing the lading within the container. The container grid bars 35 are then swung up to operative closed position and latched by the angle 38 whereupon, the container with its contents may be taken away by crane and put on a transfer truck and handled in the usual manner of handling railway type containers. When the container, with its contents, is delivered at place of destination, it is lowered onto a similar grid platform, it being understood that the bars of the platform are uniformly spaced to fit between the bars of the container. The bottom closure bars of the container are then released and permitted to swing down within the pit to the dotted line position shown at 351 in Figure 2, whereupon the container is withdrawn upwardly by crane, thus leaving the pile or stack of articles on the grid platform intact. The bars 35 of the container then being latched, the empty container may be taken away and immediately reused for the transportation of other merchandise, it being evident that the time required for loading the container and unloading the same at places of origin and destination, respectively, requires only a few minutes so that the usual transfer truck need not be detained unnecessarily and permitting maximum use of the container. It is further evident that no parts employed in the actual transportation of the goods are left at any time with the consignor or consignee, thus eliminating all possibility of loss or damage of parts.

Referring next to the construction illustrated in Figures 9 and 10, the container proper is shown as provided with side walls 120, end walls 121, all of vertically corrugated sheet metal, secured to corner posts 123, all similar to the construction of the first described form. At its bottom, the container of Figures 9 and 10 is provided along the two end walls with base angles 124 but along the two sides, Z-bars 60 are employed, as best shown in Figure 9. Each of said Z-bars 60 is arranged with its web horizontal, the inner flange 160 being extended downwardly and riveted to the lower margin of the corresponding side wall sheet, the outer flange 260 being extended vertically upward and also riveted to the crests of the corrugations 220. With this construction, it is evident that upward thrusts on the Z-bars 60 (produced by the latching mechanism hereinafter described) are effectively transmitted to and resisted by the entire side wall sheets 120 and the corrugations 220 thereof, thus minimizing any tendency of the Z-bars 60 to twist about their longitudinal axes.

Instead of employing a single set of floor bars extending from side to side as in the first described modification, the instant construction employs two sets of floor bars 135—135, each set being of a length extending from the bottom edge of the side wall to substantially the middle line of the floor or open bottom of the container. The bars 135 are mounted on shafts 133 and maintained in spaced relation thereon by spacers 136, similarly to the construction previously described. Each shaft 133 is mounted in journal brackets 131 and in the corner supporting or pedestal castings 129, the latter being of similar construction to the pedestal castings 29, heretofore described, and correspondingly mounted so as to project below the lower edges of the side and end wall sheets of the container.

To lock or latch the floor bars 135 in closed operative position, the following arrangement is used in connection with each set of bars 135. Pivotally supported from brackets 139 secured to the side wall, as by links 138, is a shallow channel 158 extending lengthwise of the container and so positioned that, when the bars 135 are in their closed operative position, the channel 158 will be interposed between the outer extended ends 235 of the bars and the web of the corresponding adjacent Z-bar 60, as shown by full lines in Figure 10. With this construction, the bars 135 act as cantilevers and the load thereon is transmitted into upward pressures on the channels 158 and from the latter effectively distributed to the Z-bars and side walls. By swinging the channels 158 outwardly to the dotted line position shown in Figure 10, it is evident that the two sets of bars 135 will fall to the dependent position shown at 335. With floor bars of approximately half length as just described, it is evident that less space beneath the containers is required to allow for their opening and closing movements, which is of advantage under certain conditions and permits the use of a grid platform mounted on a truck, as about to be described.

The improved truck, which is adapted to function as a temporary platform or support for the articles while being stacked preparatory to being placed within the container or for unloading a container, preferably comprises two Z-bar side sills 70, connected at their ends by two channel end sills 71. The truck framework is suitably mounted through journal bearing castings 72 secured to the side sills, on journals 73, which latter are provided with wheels 74 at their outer ends, adapted to run on tracks 75—75.

The Z-bar side sills are so arranged that the lower flanges thereof extend inwardly toward each other, and thus provide ledges on which are supported the platform grid bars 143, the latter being secured at their ends to the side sills by riveting or otherwise. Said platform grid bars 143 are similar to the grid bars 43, are similarly spaced and function in the same manner, as will be obvious.

With the movable truck platform shown in Figures 9 and 10, the articles to be transported may be loaded at any convenient place in the warehouse or factory of the consignor and then the truck moved to the shipping room, where the crane for handling the containers is available and, conversely, in unloading the containers may be unloaded in the receiving room and the goods or articles then taken by the truck to any other desired part of the factory or warehouse, in many instances eliminating one or more handlings of the articles or packages, as will be evident. It will further be noted from an examination of the drawings, that the grid bottom doors or supporting bars of either modification of the container, are retained in closed position in a plane above the bottom faces or supporting plane of the pedestals 28—29 so that, when the containers are resting on a car floor or other flat floor structure, the bottom doors do not have to sustain any of the load of the container body nor will they be injured as the container may be shifted about. Further, the bottom door closures and latching means therefor, when in closed or operative position, do not project outwardly at any point beyond the outside planes of the side and end walls of the container body so that the containers may be stacked closely together with other similar containers while being transported on trucks or flat bottom cars.

I have herein shown and described what I now consider the preferred manner of carrying out my invention, but the same is merely illustrative and all changes and modifications are contemplated that come within the scope of the claims appended hereto.

I claim:

1. As an article of manufacture, a transportation container having an opening in the bottom thereof and a closure for said opening, said closure including a plurality of spaced bars, the container having means for supporting the same with the bars spaced above the points of support.

2. As an article of manufacture, a transportation container having a body with an opening in the bottom thereof, a plurality of bars pivotally attached to the body at the bottom thereof and adapted to close said opening and to fall to an open position below the body; and means carried by the body at the bottom thereof for retaining said bars in operative closed position.

3. As an article of manufacture, a transportation container comprising: a body having an open bottom; a plurality of bars pivoted along one side of the body at the bottom thereof and adapted to extend across the bottom; and means supported by and at the bottom of the body for retaining the free ends of the bars when the latter are in closed operative position.

4. As an article of manufacture, a transportation container comprising: a body having an open bottom; a plurality of bars pivoted along one side of the body at the bottom thereof and adapted to extend across the bottom; and means for retaining the free ends of the bars when the latter are in closed operative position, said means including an element pivoted to the bottom edge of the opposite side of the body, said element having a shoulder engageable beneath the free ends of the bars.

5. As an article of manufacture, a transportation container having a body with an open bottom; a set of bars pivotally mounted along the bottom edge of one side of the body; another set of bars pivotally mounted along the bottom edge of the opposite side of the body; and independent means at opposite sides of the body for retaining said sets of bars in closed operative position.

6. As an article of manufacture, a transportation container having a body with an open bottom; a set of bars pivotally mounted along the bottom edge of one side of the body; another set of bars pivotally mounted along the bottom edge of the opposite side of the body; and means for retaining said sets of bars in closed operative position, said means including a pivoted shouldered element on each side of the body and engageable with the outer ends of the respective sets of bars.

7. As an article of manufacture, a transportation container having a body comprised of corrugated sheet metal side walls, the corrugations of at least one of said side walls extending vertically and substantially to the bottom thereof, said side wall having a bottom Z-bar extending therealong with the web disposed horizontally and the flanges secured to the side wall sheet in the original plane and crest of the vertical corrugations; of bottom closure means pivoted to the container along the bottom of said vertically corrugated side wall and beneath said Z-bar; and a latching device for said pivoted bottom closure means, said device being adapted to be interposed between said pivoted closure means and said Z-bar, whereby thrust from said means is transmitted to said Z-bar and from the latter to the corrugated side wall sheet.

8. A transportation container of the character described comprising: a body having sheet metal walls, a closed top and an open bottom; frame elements secured along the bottom edges of the walls; a plurality of supporting pedestals secured to the lower portions of the body; and a plurality of spaced bars pivotally mounted along one side of the body at the bottom thereof, said bars when in closed operative position being disposed above the bottoms of said pedestals.

9. As an article of manufacture, a transportation container having vertically corrugated sheet metal side walls and a Z-bar secured along the bottom edge of each side wall, each Z-bar having its web disposed horizontally in line with the corrugations, one flange secured to the marginal edge of the side wall sheet and the other flange secured to the crests of the corrugations.

10. As an article of manufacture, a transportation container adapted to be transported while supported at its bottom on a car floor or the like, said container comprising: a body having sheet metal side walls, and open bottom and supports at the lower corners extending below the side walls; door-closure means for said bottom opening, said means, when in closed operative position, being disposed above said corner supports for the container body when resting on a car floor or the like; and means on the exterior of the container body for retaining said closure means in closed operative position.

11. A transportation container of the character described comprising: a body having an open bottom and four sheet metal sides; angular reinforcing members extending along the bottom edges of each of said sides; pedestals at each lower corner of the body, the pedestals being extended downwardly below the bottom edges of the body proper and adapted to support the container body; displaceable closure means for the bottom opening of the body; and means attached to the body for retaining said closure means in operative closed position, said closure means, when in operative position, being disposed above the bottom supporting faces of the pedestals and said closure means and retaining means being all confined within the over-all outside planes of the side walls of the body.

12. A transportation container comprising: a body having an open bottom; closure supporting means pivoted along the bottom edge of one side of the body, said closure means, in operative position, extending across the open bottom of the body and to a point beyond the bottom edge of the opposite side wall of the body; and means for retaining and supporting said extended portion of the closure means, said retaining and supporting means including a supporting element having a horizontal section arranged to underlie said extended portion of the closure means, said element being pivoted to swing about an axis above and substantially in line with the edge of said extended portion of the closure means.

FRANK DITCHFIELD.